United States Patent
Hansen et al.

(10) Patent No.: US 8,135,506 B2
(45) Date of Patent: Mar. 13, 2012

(54) METHODS AND SYSTEMS FOR PROVIDING VEHICLE INFORMATION

(75) Inventors: Cody R. Hansen, Shelby Township, MI (US); Matthew M. Highstrom, South Lyon, MI (US); Andrew W. Gellatly, Macomb, MI (US); John P. Weiss, Shelby Township, MI (US); Bhavna Mathur, Novi, MI (US); Mark O. Neal, Rochester, MI (US); Dorel M. Sala, Troy, MI (US); Deborah Lucia Klose, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 395 days.

(21) Appl. No.: 12/468,410

(22) Filed: May 19, 2009

(65) Prior Publication Data
US 2010/0299017 A1 Nov. 25, 2010

(51) Int. Cl.
*G01M 17/00* (2006.01)
(52) U.S. Cl. .................................................. 701/29
(58) Field of Classification Search .................. None
See application file for complete search history.

(56) References Cited

U.S. PATENT DOCUMENTS

| | | | | |
|---|---|---|---|---|
| 7,219,063 | B2 * | 5/2007 | Schalk et al. | 704/270.1 |
| 7,912,602 | B2 * | 3/2011 | Sells et al. | 701/33 |
| 2007/0162281 | A1 * | 7/2007 | Saitoh et al. | 704/251 |
| 2007/0219807 | A1 * | 9/2007 | Schalk et al. | 704/275 |
| 2010/0127847 | A1 * | 5/2010 | Evans et al. | 340/461 |
| 2010/0268412 | A1 * | 10/2010 | Mori et al. | 701/33 |
| 2010/0286862 | A1 * | 11/2010 | Fox et al. | 701/29 |

FOREIGN PATENT DOCUMENTS
WO 2005052744 A2 6/2005

* cited by examiner

*Primary Examiner* — Faye M. Fleming
(74) *Attorney, Agent, or Firm* — Ingrassia Fisher & Lorenz, P.C.

(57) ABSTRACT

In an exemplary embodiment a system provides vehicle information to an operator of a vehicle having a plurality of components. The system comprises an onboard database configured to store vehicle-specific data and behavior-specific data and an operator interface. The system includes an onboard processor coupled to the onboard database, the plurality of components, and the operator interface. The onboard processor is configured to provide requested vehicle-specific data to the operator in response to an operator request via the operator interface. The onboard processor is also configured to receive operator-behavioral data from the plurality of components, recognize patterns of operation from the operator-behavioral data, and provide the behavior-specific data to the operator in response to the recognized patterns in the operator-behavioral data.

20 Claims, 2 Drawing Sheets

METHODS AND SYSTEMS FOR PROVIDING VEHICLE INFORMATION

TECHNICAL FIELD

This generally relates to vehicular information systems, and more particularly relates a system for presenting information to vehicle operators regarding use of the components and features that are installed on their vehicle.

BACKGROUND

Modem motor vehicles typically include many different components, options, and features such as entertainment systems, climate control systems, and navigation systems. Often, this presents a challenge for a vehicle operator to learn what components and features are installed on the vehicle, and how to use each component. Owner's manuals are a primary resource for learning about vehicle components and features. Owner's manuals, however, typically discuss components and systems that may not be installed on the operator's vehicle, but are options installed on other similar models. Therefore, it can be difficult at times for a vehicle operator to determine what components and features are installed on the vehicle, and to locate that part of the owner's manual that applies to the desired feature or component.

Accordingly, it is desirable to provide information to a vehicle operator that is specific to the vehicle. Furthermore, other desirable features and characteristics will become apparent from the detailed description and the appended claims, taken in conjunction with the accompanying drawings and the technical field and background.

SUMMARY

In an exemplary embodiment a system provides vehicle information to an operator of a vehicle having a plurality of components. The system comprises an onboard database configured to store vehicle-specific data and behavior-specific data and an operator interface. The system includes an onboard processor coupled to the onboard database, the plurality of components, and the operator interface. The onboard processor is configured to provide requested vehicle-specific data to the operator in response to an operator request via the operator interface. The onboard processor is also configured to receive operator-behavioral data from the plurality of components, recognize patterns of operation from the operator-behavioral data, and provide the behavior-specific data to the operator in response to the recognized patterns in the operator-behavioral data.

In another embodiment a system provides vehicle-specific data for a plurality of vehicles each having different features. The system comprises a remote database configured to store the vehicle-specific data for each of the plurality of vehicles and a communication system coupled to the remote database. The system also includes a processor coupled to the remote database and to the communication system. The processor is configured to receive vehicle identification data for each of the plurality of vehicles and to assemble the vehicle-specific data for each of the plurality of vehicles.

A method is disclosed for providing information to an operator of a vehicle having a plurality of components. The method comprises receiving operator-behavioral information from the plurality of components, recognizing patterns in the operator-behavioral data, and providing information to the operator based on the recognized patterns.

DESCRIPTION OF THE DRAWINGS

A more complete understanding of the subject matter may be derived by referring to the detailed description and claims when considered in conjunction with the following figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In an exemplary embodiment information related to the use of vehicle components is presented to a vehicle operator based on the use of the components. In determining what information to present, an onboard processor receives information from multiple components and identifies patterns of use of the multiple components. Patterns of use may include repeated actions when using a component, as well as periods of non-use for a component or feature. Based on the patterns of use, the onboard processor can present information to the vehicle operator that is likely to be new information for the operator related to the vehicle components and features.

In another embodiment the vehicle operator can receive vehicle-specific data for an individual vehicle. In this embodiment the vehicle operator uses a computer terminal to access a database containing a list of components and features installed on the individual vehicle. The vehicle operator enters information to identify the individual vehicle and a vehicle-specific owner's manual is assembled using the list of components and features installed on the vehicle.

Figure 1:
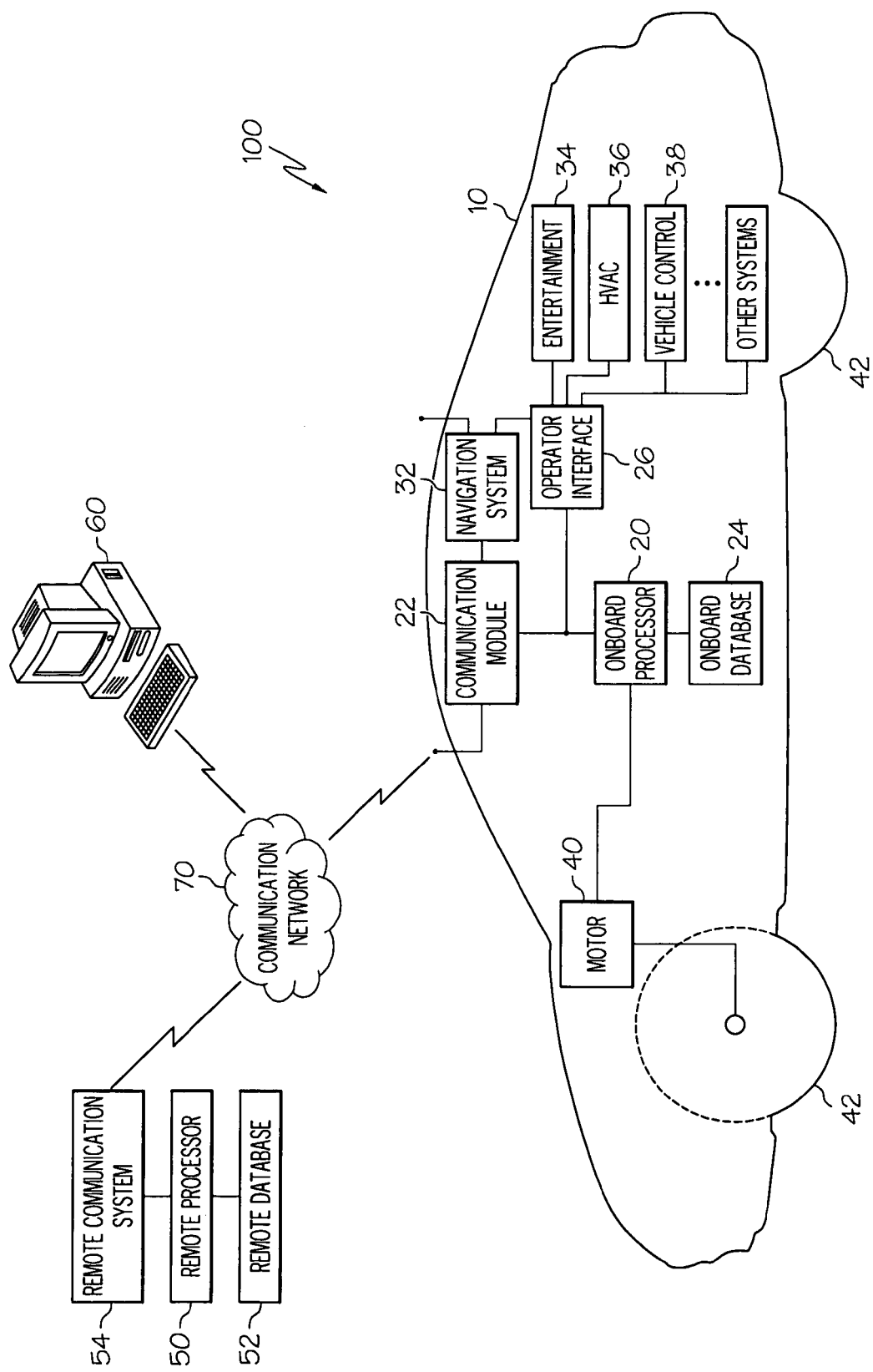
FIG. 1 is a simplified diagram of an exemplary system for providing information to a vehicle operator.

FIG. 1 is a block diagram of a system 100 for providing information that is specific to the vehicle and to the vehicle operator. In the exemplary embodiment, system 100 includes a vehicle 10 that suitably includes an onboard processor 20. Onboard processor 20 has a first input coupled to an onboard communication module 22 for receiving vehicle-specific data through a communication network 70, a second input coupled to an onboard database 24 for receiving data including stored vehicle-specific data and stored behavior-specific data, a third input coupled to an operator interface 26 for receiving data input by the operator including operator-behavioral data coupled from any/all control systems associated with the plurality of vehicle components, and a fourth input coupled to a motor 40 for receiving data related to the efficiency of motor 40. Operator interface 26 has multiple inputs and outputs coupled to vehicle components to receive data related to operator interactions with the components and to operate the components including a navigation system 32, a heating, ventilating, and air-conditioning (HVAC) system 36, a vehicle control system 38, and other systems. Motor 40 has an output coupled to wheels 42 to propel vehicle 10 in any conventional manner. Onboard processor 20 has a first output coupled to onboard database 24 for storing data, a second output for sending data to communication network 70 through onboard communication module 22, and a third output coupled to operator interface 26 for providing information to the vehicle operator. In this embodiment, system 100 also includes a remote processor 50 having a first input coupled to a remote database 52 for receiving stored data, and a second input coupled to a remote communication system 54 for receiving data from computer terminal 60 and vehicle 10. Remote processor 50 has a first output coupled to remote database 52 for storing data, and a second output coupled to remote communication system 54 for sending information to computer terminal 60 and vehicle 10 through communication network 70.

Onboard processor 20 identifies patterns of use in data received from the plurality of components and delivers information to the vehicle operator related to the identified patterns. The patterns identify which features are used and which features are not used. Onboard processor 20 then provides information via audio and/or display devices related to one of the unused features.

In the exemplary embodiment, onboard processor 20 receives operator-behavioral data from components including navigation system 32, and motor 40. Processor 20 also receives operator-behavioral data from systems controlled through operator interface 26 including entertainment system 34, HVAC system 36, vehicle control systems 38, safety systems, information systems, and other systems or components on vehicle 10. Onboard processor 20 recognizes patterns in the operator-behavioral data from the components, and correlates the recognized patterns to specific messages that are stored in onboard database 24 as part of behavior-specific data. The specific messages are then presented to the vehicle operator through operator interface 26.

In the exemplary embodiment operator interface 26 is any device or set of devices that provides information to the operator and allows the operator to control vehicle components. Operator interface 26, for example, may be a display touch screen that is coupled to multiple vehicle systems. Alternatively, operator interface 26 may include multiple buttons coupled to multiple components with information messages provided to the operator through vehicle speakers.

The messages in the behavior-specific data are provided to the vehicle operator in at least two ways in the exemplary embodiment. First, onboard processor 20 presents a message while the vehicle operator is using a component, when a pattern is recognized corresponding to the message. By presenting a message while the operator is using a component, the operator can learn more about the feature by immediately using the feature, thus increasing the efficiency in learning about the new feature, compared to using a non-vehicle-specific printed owner's manual.

As an illustrative example, the vehicle's entertainment system 34 is capable of searching stored music files using an artist's name. In this example the operator has not used this feature and browses through the stored music files using other features, selecting music by the same artist multiple times. On each occasion when the operator uses entertainment system 34, onboard processor 20 stores operator-behavioral data in onboard database 24 including the browsing pattern and the music files selected through operator interface 26. In this manner the operator's actions while using the entertainment system are stored as operator-behavioral data. Onboard processor 20 identifies patterns in the operator-behavioral data. In this case a pattern is identified with multiple songs selected that have the same artist in common. Based on the pattern, onboard processor 20 provides the operator with stored behavior-specific data describing the feature for searching music files by artist.

Second, the behavior-specific data is presented to the vehicle operator at intervals, rather than in response to a recognized pattern of use. In this case the intervals may correspond to each time the vehicle is activated, so that a message is presented each time onboard processor 20 is powered on. By presenting messages at intervals, a vehicle operator can continually learn the features of vehicle 10 over a longer period of time, and thus gain a deeper understanding of the features than would be gained using a non-vehicle-specific printed owner's manual.

In the exemplary embodiment, vehicle information is also presented to the vehicle operator using computer terminal 60. Computer terminal 60 communicates with remote database 52 that stores information related to components for many different vehicles, as well as a list of components installed on each vehicle. The vehicle operator uses computer terminal 60 to send vehicle identification data such as a vehicle identification number (VIN) or a code that identifies vehicle 10 to remote processor 50. Remote processor 50 uses the vehicle identification data and the list of components installed on vehicle 10 to provide information to the vehicle operator that is specific to the installed components.

Remote processor 50 also requests user operational preferences from the vehicle operator. The user operational preferences may include physical attributes of the vehicle operator such as height, and preferences related to use of vehicle features such as whether the vehicle is typically used with other passengers including children. Remote processor 50 may use the user operational preferences to determine how to present vehicle information. In the exemplary embodiment the user operational preferences are received as answers to questions about features preferred by the vehicle operator. The user operational preferences are also derived based on questions about the vehicle operator's attributes and intended uses of vehicle 10.

In the exemplary embodiment vehicle-specific data is delivered to the vehicle operator that is specific to an individual vehicle and specific to the preferences of the operator. If the vehicle operator does not provide the user operational preferences, then remote processor 50 provides vehicle-specific data for vehicle 10 to the vehicle operator with information about each of the specific components. If the vehicle operator does provide user operational preferences, then remote processor 50 provides vehicle-specific information and identifies parts of the vehicle-specific data that are related to the user operational preferences as user related data. The user related data is presented along with other vehicle-specific data and is arranged to be displayed more prominently or less prominently according to the user operational preferences.

In an illustrative example, vehicle 10 includes a back seat with anchors for child car seats, and the vehicle-specific data includes a section about seating. In this case the vehicle driver provides user operational preferences that indicate the vehicle is likely to be used with small children in car seats. Remote processor 50 uses this information to identify information about the use of child car seat anchors as user related data. The information about child car seat anchors is then displayed closer to the beginning of the section about seating to make it more prominent and easier to access.

The computer terminal 60 receives the vehicle-specific data, including the user related data, and displays or presents the data in any suitable format. The vehicle operator can then easily determine how to use the features and functions that are actually installed on the vehicle. By presenting the vehicle-specific data to the vehicle operator in this manner, the owner's manual that is delivered with the vehicle may be reduced in size thereby saving costs and resources.

In the exemplary embodiment the vehicle-specific information is transferred from remote database 52 to vehicle 10 and is also displayed through operator interface 26. The vehicle-specific data is received from remote database 52 through onboard communication module 22 and stored in onboard database 24.

Onboard processor 20 uses the vehicle-specific data in determining how to present the behavior-specific data. In this case the vehicle-specific data received from remote database 52 includes the list of components installed on the vehicle and the user operational preferences. Onboard processor 20 correlates messages in the behavior-specific data to the user operational preferences and determines an order for presenting the messages at intervals.

Figure 2:
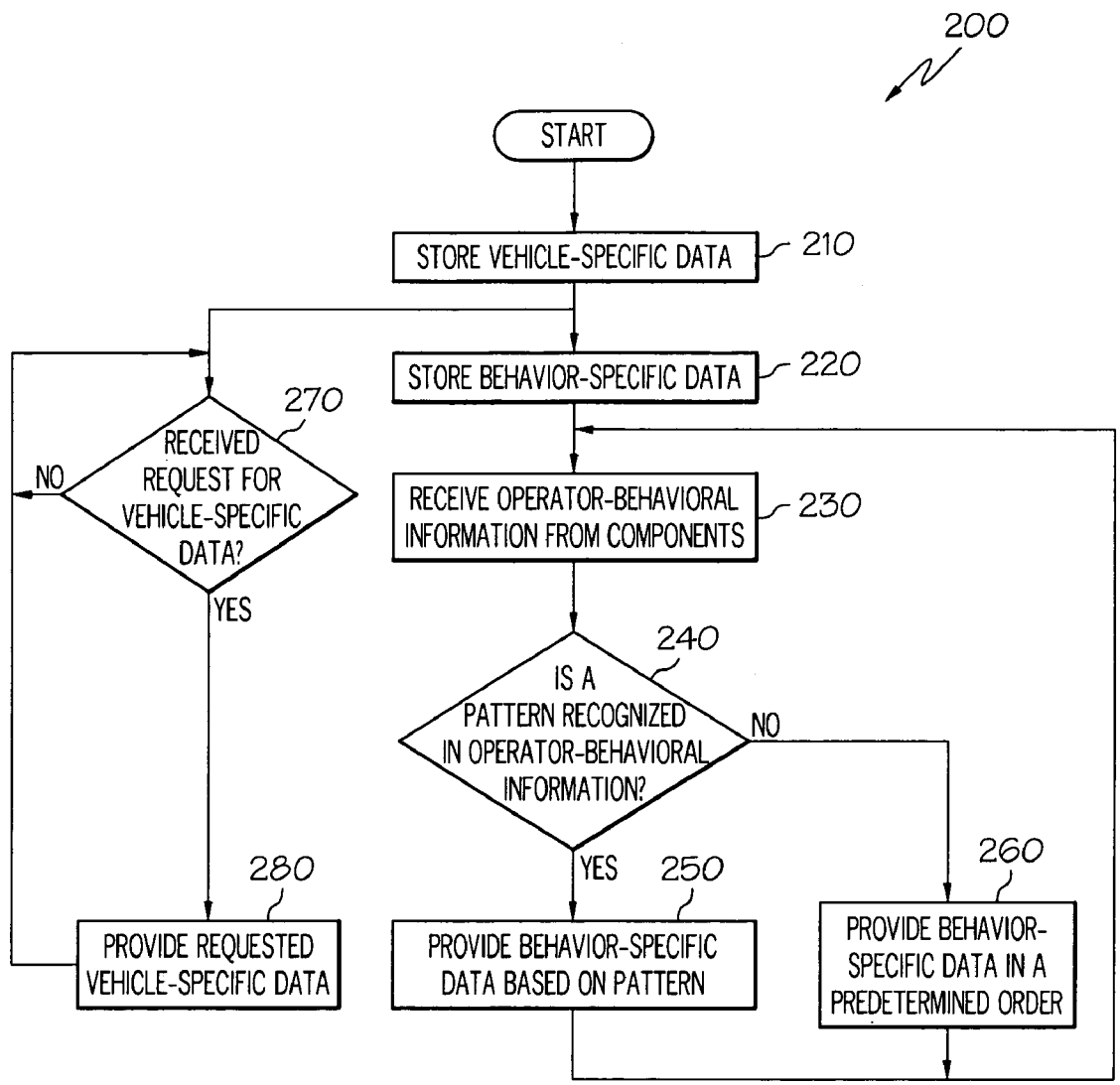
FIG. 2 is a flow chart of an exemplary method of providing information to the vehicle operator.

Turning now to FIG. 2, an exemplary method 200 for providing information to the vehicle operator suitably includes the broad functions of receiving operator-behavioral information from components on the vehicle (function 230), recognizing patterns in the operator-behavioral information (function 240), and providing behavior-specific data to the vehicle operator based on the recognized pattern (function 250). Other embodiments additionally store vehicle-specific data (function 210), store behavior-specific data (function 220), and provide behavior-specific data in a predetermined order (function 260). Exemplary method 200 also determines if a request is received for vehicle-specific data (function 270) and provides the requested vehicle-specific data (function 280). Various other functions and other features may also be provided, as described in increasing detail below.

In an exemplary embodiment vehicle-specific data is stored (function 210) in onboard database 24 (FIG. 1). The vehicle-specific data is received from remote database 52 and includes information about use of the components in vehicle 10, a list of components installed on vehicle 10, and user operational preferences. In this case the vehicle-specific data is organized and arranged so that sections of the vehicle-specific data can be retrieved and displayed using operator interface 26. Sections of the vehicle-specific data can also be used by onboard processor 20.

Onboard database 24 also stores behavior-specific data (function 220). In the exemplary embodiment behavior-specific data includes individual messages that correspond to component features.

Onboard processor 20 (FIG. 1) receives data from components (function 230) and stores the data in onboard database 24 as operator-behavioral information. The operator-behavioral information includes information about what features on a component are used by the vehicle operator and how the features are used.

In the exemplary embodiment onboard processor 20 (FIG. 1) identifies patterns in the operator-behavioral information (function 240). When data is received from a component (function 230), onboard processor 20 determines if a pattern is recognized (function 240) in the operator-behavioral data stored in onboard database 24 including the data received.

If a pattern is recognized that corresponds to a message in the stored behavior-specific data, then the message in the behavior-specific data is provided to the vehicle operator (function 250). The message is provided to the vehicle operator through operator interface 26 (FIG. 1).

If a pattern is not recognized in the operator-behavioral information (function 240), then a message from the behavior-specific data is provided to the vehicle operator in a predetermined order (function 260). In this case the predetermined order is based on the user-specific data with the operator preferences so that messages related to preferred features are presented before other messages. The messages that are not based on a recognized pattern are presented to the operator at intervals as discussed above.

In the exemplary embodiment, onboard processor 20 (FIG. 1) determines when the vehicle operator requests information through the operator interface 26 (function 270). When the request is received, onboard processor 20 correlates the request to a section of the vehicle-specific data, and provides the requested information to the vehicle operator (function 280).

Generally speaking, the various functions and features of method 200 may be carried out with any sort of hardware, software and/or firmware logic that is stored and/or executed on any platform. Some or all of method 200 may be carried out, for example, by logic executing within vehicle 10 in FIG. 1. In one embodiment, onboard processor 20 executes software logic that performs each of the various functions shown in FIG. 2. Such logic may be stored in onboard database 24 or in any other storage available to onboard processor 20 as desired. Hence, the particular logic and hardware that implements any of the various functions shown in FIG. 2 may vary from context to context, implementation to implementation, and embodiment to embodiment in accordance with the various features, scenarios and structures set forth in this application. The particular means used to implement each of the various functions shown in FIG. 2, then, could be any sort of processing structures that are capable of executing conventional software logic in any format. Such processing hardware may include onboard processor 20 or other components of system 100 in FIG. 1, as well as any other processors or other components associated with any conventional vehicle, computer terminal, data server and/or the like.

While at least one exemplary embodiment has been presented in the foregoing detailed description, it should be appreciated that a vast number of variations exist. Recognized patterns of use, for example, may be any suitable pattern. Processor may recognize a predetermined pattern, or a pattern determined entirely from the data collected from vehicle components. Patterns may include when a feature is used and when it is not used. The behavior-specific data that is presented based on recognized patterns may be presented at intervals rather than when the pattern is recognized. The behavior-specific data may be presented at other intervals of time than each time vehicle 10 is activated. Other examples of intervals include once each week, intervals based on distance traveled such as once every fifty miles, or intervals based on location such as each time a vehicle starts from a home location.

The functions performed by remote processor may be performed by any suitable processor, including onboard processor 20. In one example, information for several different vehicle models is stored in onboard database 24, and onboard processor receives a list of the components specific to vehicle 10. Onboard processor 20 then provides the vehicle-specific information to the vehicle operator based on the list of components. Data, including vehicle-specific data and behavior-specific data may be transferred to onboard database 24 in any suitable manner. Onboard database 24, for example, may have data stored prior to installation on vehicle 10. Alternatively data may be transferred from remote database 52 to onboard database 24. Operator interface 26 may include a data storage reader such as a DVD reader, and the vehicle-specific data may be received through the data storage reader rather than through communication network 70.

The vehicle-specific data and the behavior-specific data may include data in any suitable format. Data may be in a text format, an image format, an audio format, or a video format. The data may be presented through computer terminal 60 or operator interface 26 in any suitable manner including a visual display or an audio message. The messages in the behavior-specific data may be presented in any order. A predetermined order may be a random order or other order as well as the order based on operator preference discussed above.

In exemplary embodiments discussed above, operator interface 26 is presented as an interface to control multiple components in vehicle 10. Alternatively, operator interface 26 can include multiple individual interfaces for separate components or systems such as entertainment system 34, navigation system 32, HVAC system 36, vehicle control systems 38 including controls for lighting, engine throttle, steering, defrost, windshield wipers, and other controls.

It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for providing vehicle information to an operator of a vehicle having a plurality of components, the system comprising:
    an onboard database configured to store vehicle-specific data and behavior-specific data;
    an operator interface;
    an onboard processor coupled to said onboard database, said plurality of components, and said operator interface, said onboard processor configured to:
        (a) provide requested vehicle-specific data to the operator in response to an operator request via said operator interface,
        (b) store operator-behavioral data received from said plurality of components,
        (c) recognize patterns of operation from said stored operator-behavioral data, and
        (d) selectively provide at least one message retrieved from said behavior-specific data to the operator in response to said patterns.

2. The system of claim 1 further comprising a remote database configured to store vehicle identification data, and to store said vehicle-specific data associated with said vehicle identification data.

3. The system of claim 2 further comprising a vehicle communication module coupled to said onboard processor and configured to receive said vehicle-specific data from said remote database in response to a request therefor.

4. The system of claim 1 wherein said vehicle-specific data includes user operational preferences.

5. The system of claim 4 wherein said user operational preferences include physical attributes of the operator.

6. The system of claim 4 wherein said user operational preferences include the operator's intended uses for the vehicle.

7. The system of claim 1 wherein said vehicle information includes messages for instructing the operator regarding use of said plurality of components.

8. The system of claim 1 wherein said recognized patterns of operation include patterns of operator inputs to at least one of said plurality of components.

9. The system of claim 1 wherein said plurality of components is selected from the group consisting of: an entertainment system; a navigation system; a communication system; a vehicle control system; a safety system; an information system; and a heating, ventilating, and air-conditioning system.

10. The system of claim 1 wherein said plurality of components includes a system for propelling the vehicle, wherein said recognized patterns of operation includes data related to efficiency of the system for propelling the vehicle.

11. The system of claim 1 wherein said plurality of components includes a navigation system.

12. A method of providing information to an operator of a vehicle having a plurality of components, the method comprising:
    storing operator-behavioral data received from said plurality of components;
    recognizing patterns in said stored operator-behavioral data; and
    providing information to the operator based on said recognized patterns.

13. The method of claim 12 further comprising receiving vehicle-specific data.

14. The method of claim 13 wherein said vehicle-specific data includes user operational preferences.

15. The method of claim 12 wherein providing said information to the operator includes presenting a plurality of messages to the operator at predetermined intervals.

16. A method of providing information to an operator of a vehicle having a plurality of components, the method comprising:
    receiving operator-behavioral data from said plurality of components;
    recognizing patterns in said operator-behavioral data; and
    providing information to the operator based on said recognized patterns including presenting a plurality of messages to the operator at predetermined intervals;
    wherein said predetermined intervals correspond to each time the vehicle is activated.

17. A system for providing information for a plurality of vehicles each having different features, the system comprising:
    a remote database configured to store vehicle-specific data related to the features installed on each of the plurality of vehicles;
    a communication system coupled to said remote database;
    a processor coupled to said remote database and to said communication system, said processor configured to receive vehicle identification data for each of the plurality of vehicles and to assemble said vehicle-specific data for each of the plurality of vehicles, wherein the assembled vehicle-specific data includes information regarding use of the features.

18. A system for providing information for a plurality of vehicles each having different features, the system comprising:
    a remote database configured to store vehicle-specific data related to the features installed on each of the plurality of vehicles;
    a communication system coupled to said remote database; and
    a processor coupled to said remote database and to said communication system, said processor configured to receive vehicle identification data for each of the plurality of vehicles and to assemble said vehicle-specific data for each of the plurality of vehicles, wherein the assembled vehicle-specific data includes information regarding use of the features; and
    wherein said vehicle-specific data contains user related data, wherein said processor receives user operational preferences and modifies said user related data based on said user operational preferences.

19. The system of claim 17 wherein said processor is a processor onboard one of the plurality of vehicles.

20. The system of claim 17 wherein said processor is remote from the plurality of vehicles.

* * * * *